May 11, 1926.
C. B. NELSON
1,583,896
FRINGE MAKING MACHINE
Filed May 26, 1924     7 Sheets-Sheet 6
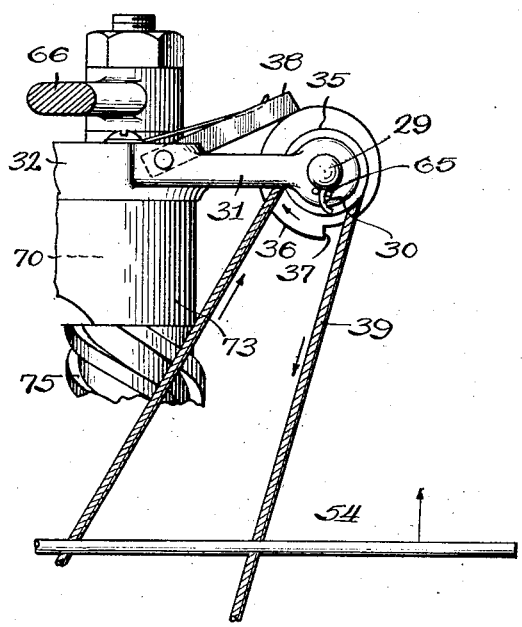
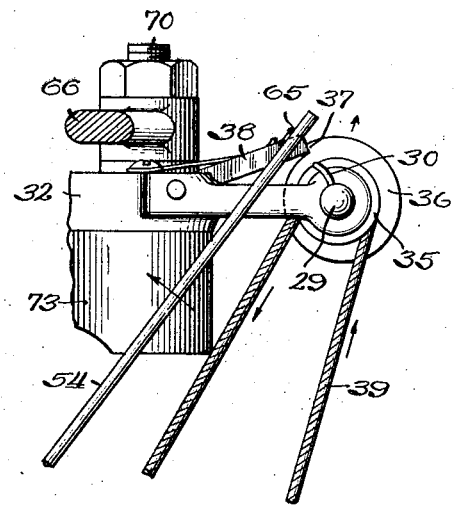
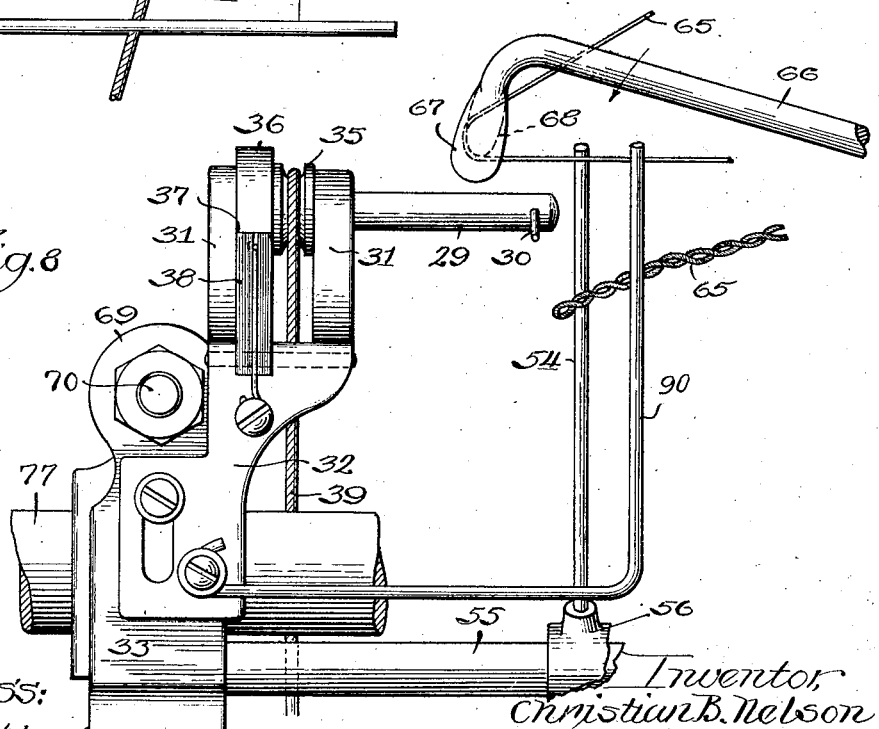
Witness:
Chas. R. Kourst
Inventor,
Christian B. Nelson
By Thomson, Ranshuer + Lundy, Attys.

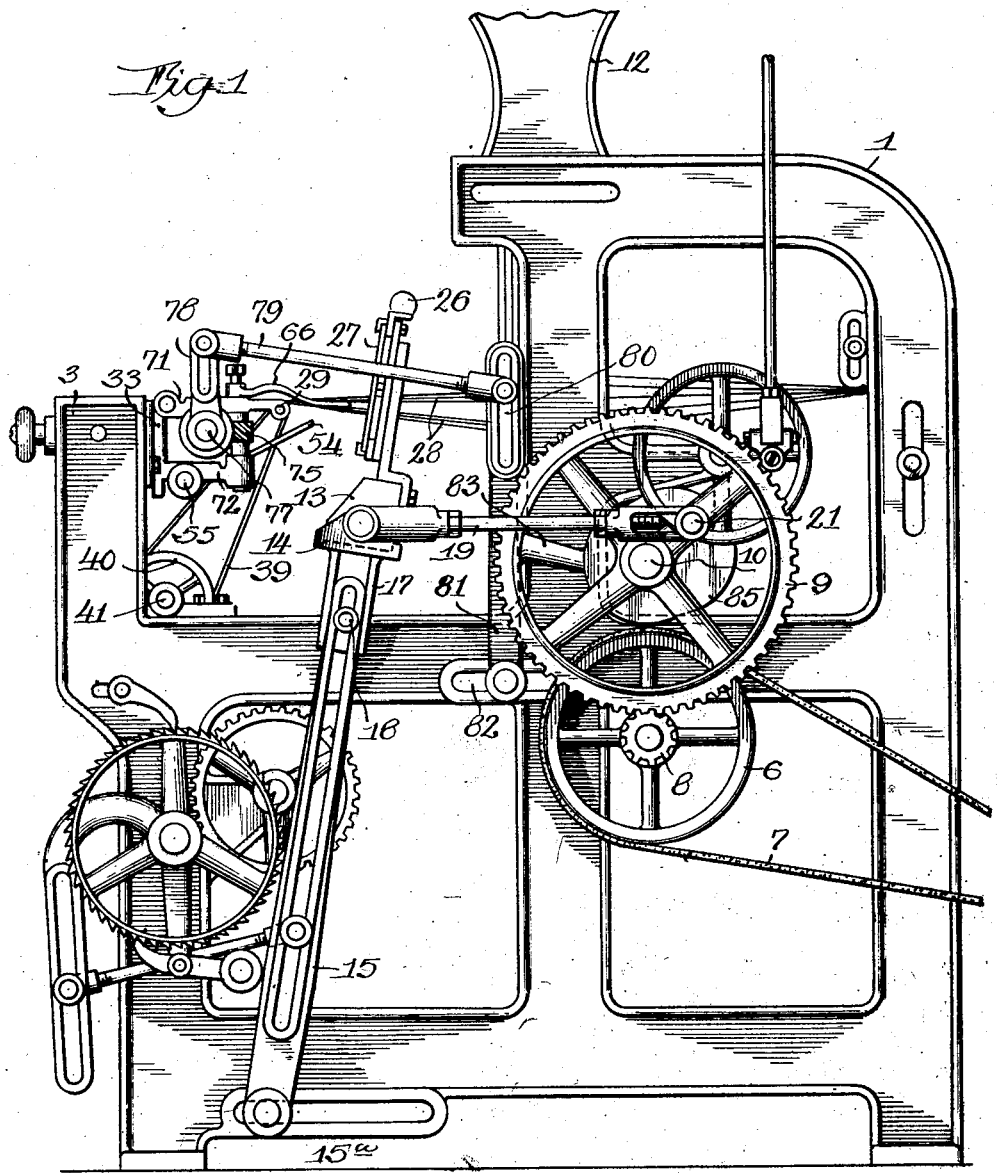

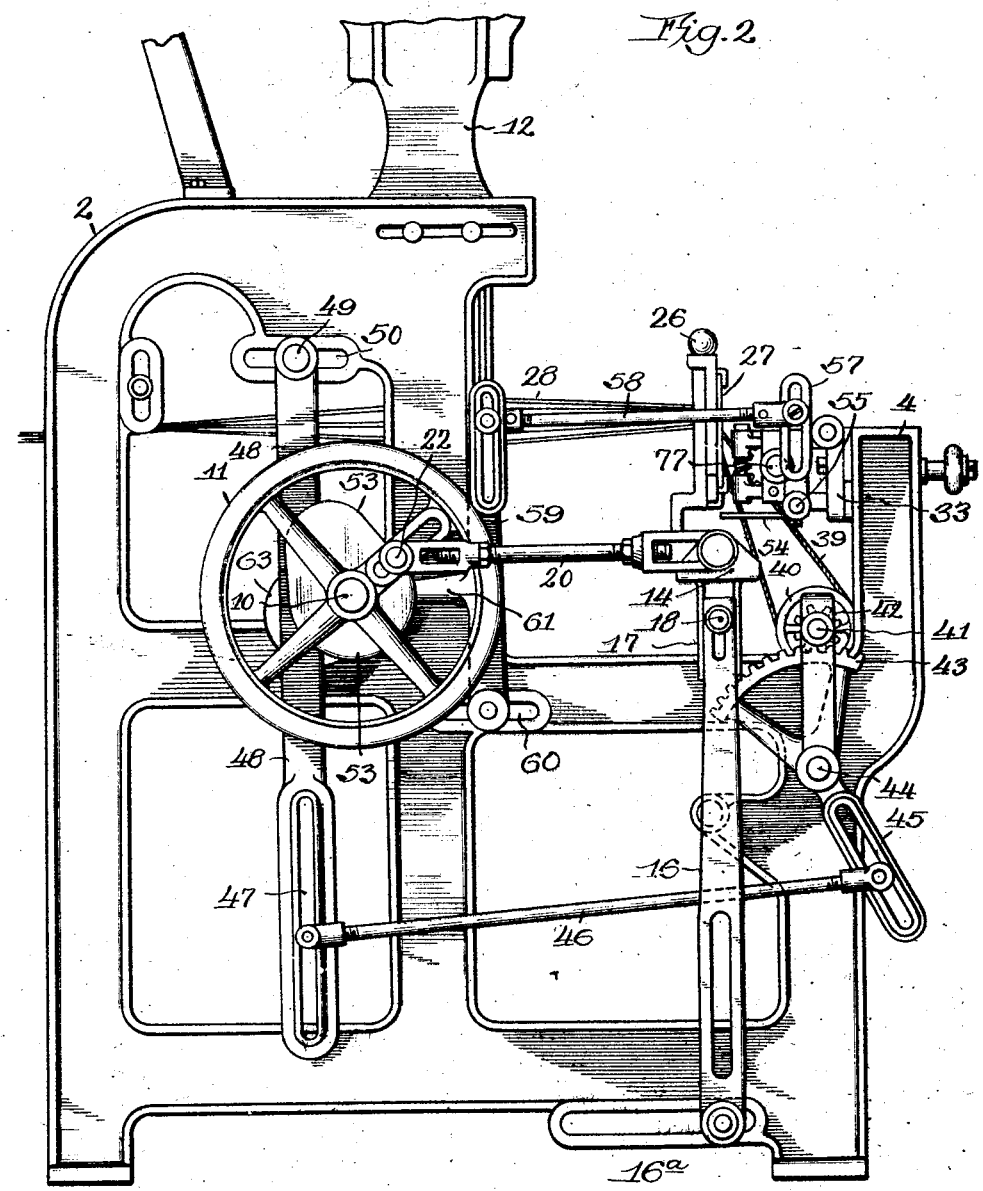

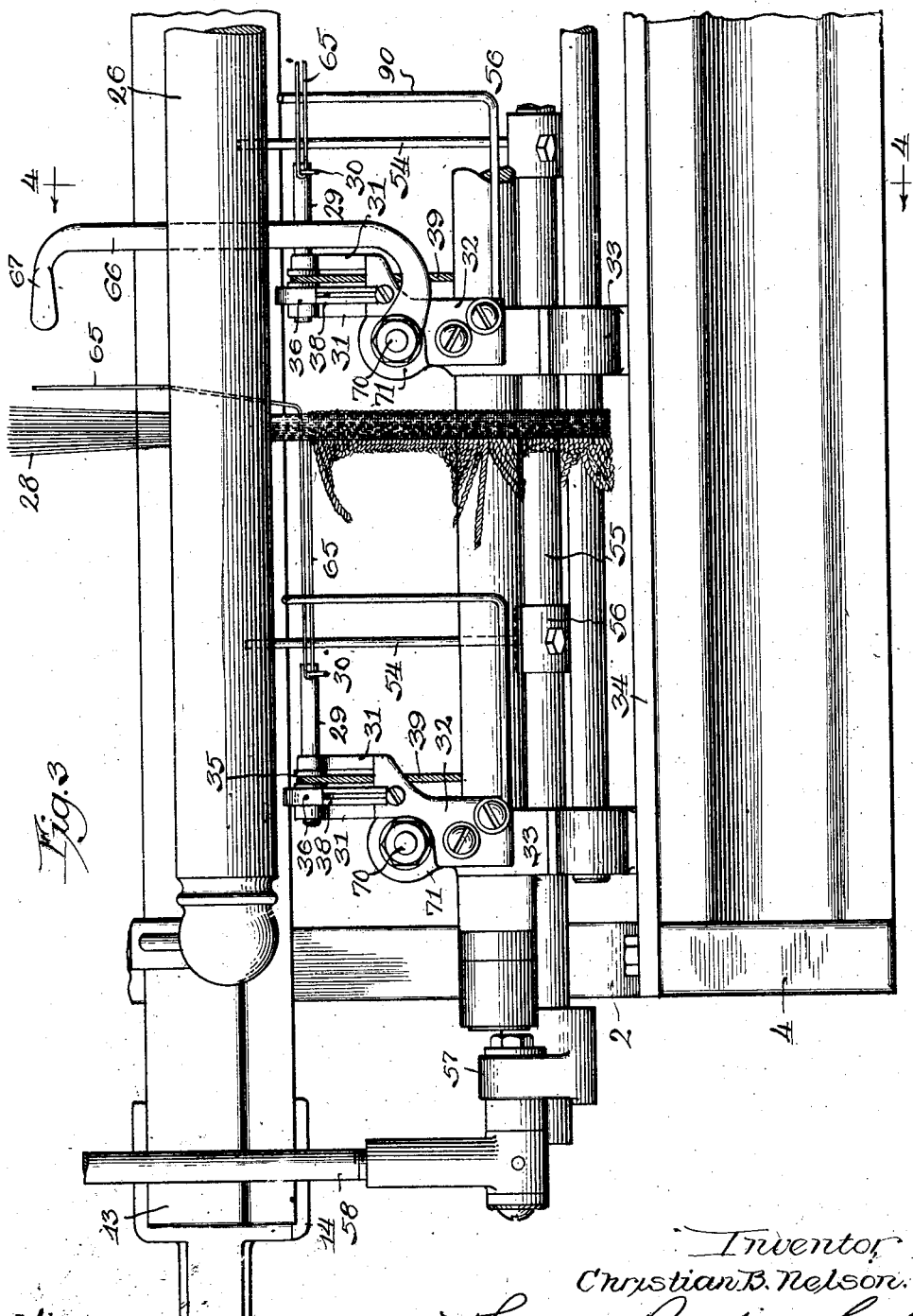

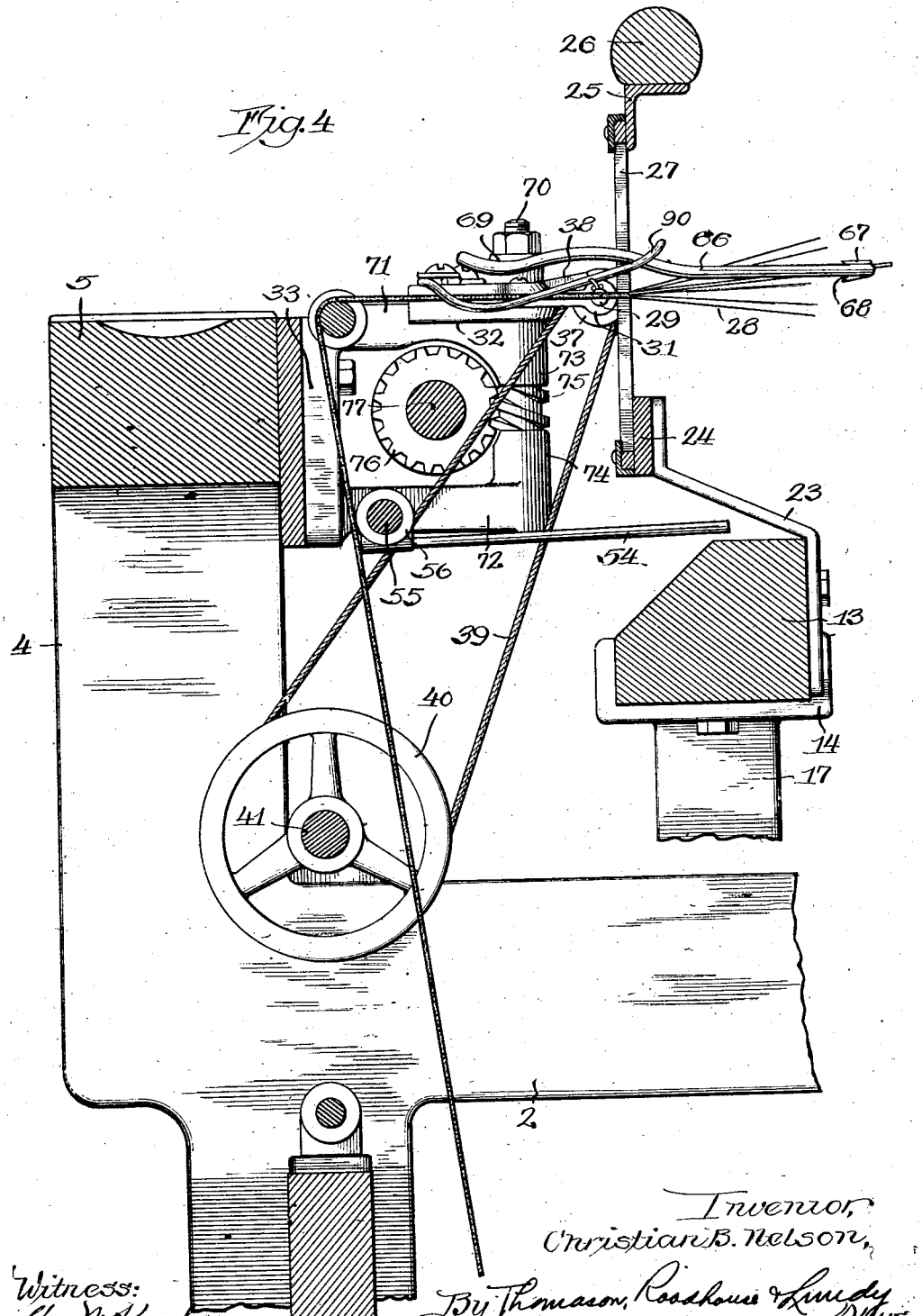

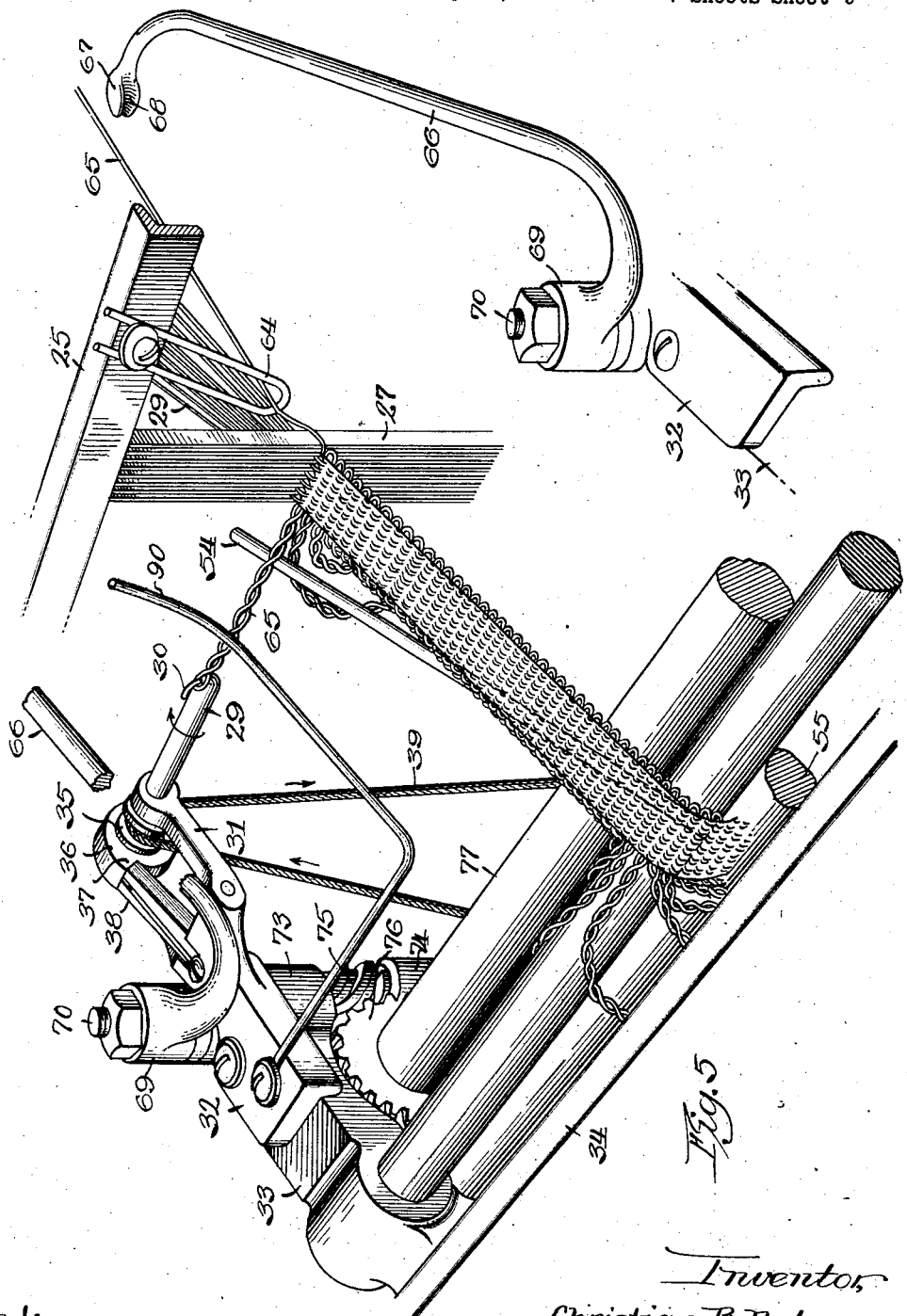

May 11, 1926.
C. B. NELSON
1,583,896
FRINGE MAKING MACHINE
Filed May 26, 1924  7 Sheets-Sheet 7
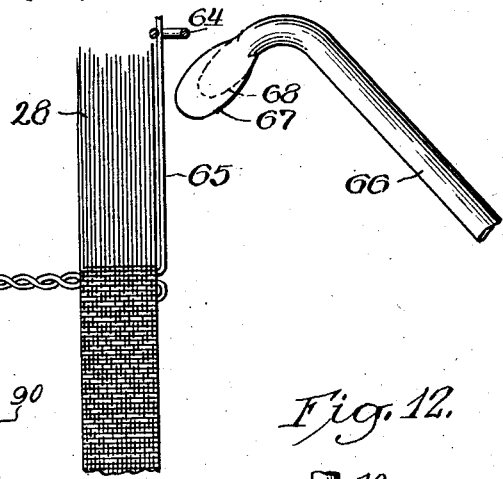
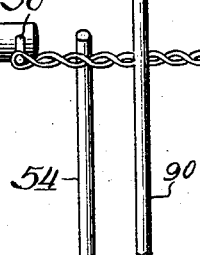
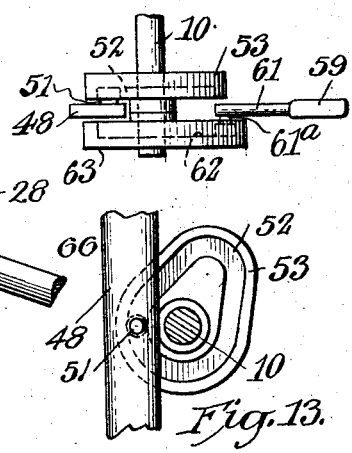
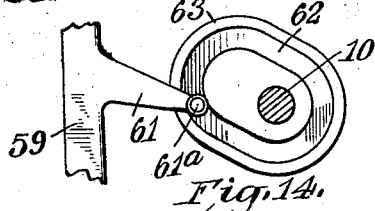
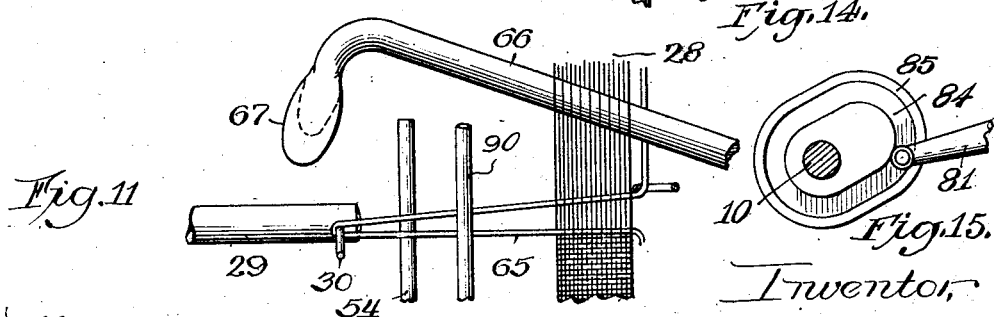
Inventor,
Christian B. Nelson,
By Thomason, Rosehome & Lundy Attys.
Witness:
Chas. R. Loursh.

Patented May 11, 1926.

1,583,896

UNITED STATES PATENT OFFICE.

CHRISTIAN B. NELSON, OF CHICAGO, ILLINOIS.

FRINGE-MAKING MACHINE.

Application filed May 26, 1924. Serial No. 715,905.

My present invention relates to an apparatus which will automatically weave or fabricate a fringe that is provided with a woven tape or selvedge from which extends the twisted or straight strands. Fringes of this character are frequently employed for decorative purposes upon lamp shades, upholstering, and for divers other purposes. It is one of the objects of my present invention to provide a structure which will automatically weave the fringe, both the pendant pieces as well as the woven tape and which will operate in a very simple manner so that the apparatus may be rapidly operated and thereby fabricate a large quantity of the fringe during a given period of operation. It is also an object of my invention to provide a structure of this character wherein means are provided for automatically twisting the pendant cords during the steps of weaving the tape or selvedge to which the cords are attached, and it is a further object to provide a unit for this purpose that is extremely compact in construction so that a large number of said units may be assembled in a single apparatus and the same will occupy but a comparatively small space so that a number of such apparatus may be installed in a factory room having a restricted floor area.

Further objects will be apparent to others skilled in the art after my invention is understood from the following description, and I prefer to carry out my invention and accomplish the numerous objects thereof by means of the structure herein disclosed, the drawings illustrating a typical embodiment of the principles of my invention.

In the drawings:—

Figure 1 is a vertical end elevation of the structure at the motor or driving end of the apparatus showing the carrier supporting combs for the braid moved away from the twister device.

Figure 2, is a vertical elevation of the opposite end of the apparatus showing the comb carrier moved up to the twisted elements.

Figure 3, is a top plan of a fragmentary portion, drawn to an enlarged scale, showing the application of my invention and illustrating a set or unit of the fringe making members.

Figure 4 is a vertical transverse section taken on line 4—4 of Figure 3 and looking in the direction of the arrows.

Figure 5, is a perspective of one of the fringe making units showing the relative positions of the parts at the end of the operation of twisting the pendant threads.

Figure 6, is a detail fragmentary view showing the twister spindle and its drive in the position assumed while rotating to twist the fringe and the throw off arm at rest.

Figure 7, is a similar view to Figure 6 showing the throw-off arm causing the disengagement of the twisted thread from the twister spindle when the latter is at rest.

Figure 8, is a top plan of a twister unit with the parts in the relative positions shown in Figure 7 and with the looper arm approaching the twister spindle.

Figures 9, 10 and 11 are schematic views illustrating the relative positions of the twister spindle and looper arm during three stages of the operation.

Figure 12 is a top plan showing the arrangement of the cams and connected levers for actuating the twister spindle and the throw-off arm of the apparatus at the left-hand end of the latter.

Figure 13, is a face view of the cam and lever for actuating the twister.

Figure 14 is a similar view of the cam and lever for actuating the throw-off.

Figure 15 is a face view of the cam and lever for actuating the looper-arm.

In the drawings, I have employed similar reference characters to designate like parts wherever the same occur throughout the several views.

Referring first to Figures 1 and 2, the structure comprises cast metal end frames 1 and 2, the former being at the motor or drive end of the apparatus and the latter at the opposite end thereof. These frames are somewhat rectangular in shape and are divided by vertically and horizontally disposed crossed members so as to provide three square portions, and at the forward or front portion of the machine the outer members of the frame are omitted. A standard 3 is provided on the forward or front portion of the frame 1 and a similar standard 4 is provided upon the corresponding portion of the other frame 2. The upper ends of these standards 3 and 4 are connected by an elongated horizontal sill 5 upon which is carried the twisting mechanism which will hereinafter be more fully described. A pulley 6 derives its power through a belt 7 from a motor, a line shaft or other suitable source, and the hub of this pulley is provided with a pinion 8 that is in mesh with a large drive gear 9. Extending longitudinally of the apparatus and journaled in suitable bearings in the end frames 1 and 2, and at approximately the inter-section of the vertical and horizontal crossed pieces, is the main drive shaft 10 of the apparatus. One end of this shaft extends beyond its bearings in the end frame 1, has a drive gear 9 secured to it that meshes with pinion 8 or the drive pulley, and the opposite end of said shaft which extends through its bearings in the other end frame 2 is provided with a balance wheel 11.

The harness structure, including the heddles and their associated elements, forms no portion of my present invention, and are therefore not illustrated. The harness structure however is supported upon the frame carried by the standards 12 that are mounted upon the horizontal elements of the respective end frames 1 and 2.

The comb-carrying structure and the actuating device therefor comprises a horizontal rail 13, the ends of which are mounted in suitable seats 14 carried upon the upper end portions of vertically disposed levers 15 and 16 positioned outside the end frame 1 and 2 respectively and pivotally and adjustably mounted at their lower ends in horizontally elongated slots 15ª and 16ª in the respective end frames. The seats 14 are adjustable longitudinally of the respective levers 15 and 16 so as to elevate or lower the rail and combs by means of lateral extensions 17 that are movable longitudinally upon the lever arms and are secured in place by adjustable pins 18 that co-act with said extensions and the adjacent portions of the levers 15 and 16. The frame for the comb is moved toward and away from the fringe twisting structure by means of pitmen 19 and 20 that are connected in an adjustable manner with the gear 9 and with the balance wheel 11 by means of wrist pins 21 and 22 projecting from the respective elements. Secured to the rail 13 by means of a plurality of brackets 23 is a longitudinally extending bar 24 that is horizontally disposed and extends from end to end of the comb frame, and spaced from this bar, but parallel thereto, is a corresponding length of angle metal 25 having a suitable hand grasp 26 upon the upper horizontal flange. This angle piece and the bar 24 have secured thereto the upper and lower ends of a series of combs 27 that extend between said elements and that are utilized to guide the warp threads 28 to the braiding and twisting mechanism.

The fringing or twisting apparatus consists of a plurality of units that are duplicated and are spaced apart at regular intervals in front of the comb frame and, as these structures are all of the same design, the description herein of a single unit will suffice and will be understood as applying to all the others. In connection with the twisting structure I have provided simple means for throwing off the twisted thread after the same has been looped and wound the desired extent. It will be understood in this connection that a suitable cutter also may be employed so that after the threads have been looped the same may be cut at the free end of the loop instead of being twisted so as to produce what is known as "cut fringe."

The means for twisting the threads which hang pendent from the selvedge or braid comprises a spindle 29 having upon its outer end a curved or segmentally shaped pin 30 that projects laterally therefrom. This spindle is journaled intermediate its ends in a bearing in the outer portion of the bifurcations or spaced arms 31 of an irregularly shaped bracket 32 which is secured to the upper portion of a U-shaped holder 33. The latter structure is bolted or otherwise secured to a horizontal bar 34 positioned upon its edge and mounted upon the adjacent face of the sill 5 that connects the standards 3 and 4 of the respective end frame. Between the bifurcations or arms 31 the spindle 29 is provided with a pulley 35, and alongside this pulley, or preferably formed integrally therewith, is a suitable ratchet element in the form of a disk 36 having its edge provided with single tooth or shoulder 37 and which is engaged upon its periphery by a spring pressed pawl element 38 pivoted upon the bracket 32. A belt 39 or the like operatively connects the pulley 35 with a larger drive pulley 40 secured upon the adjacent portion of an oscillatory shaft 41 that has a horizontally disposed axis. This shaft is journaled in suitable bearings in end frames 1 and 2 of the structure, and said shaft extends beyond its bearing in the frame 2 where it is provided with a pinion 42 that is engaged and actuated by means of a gear segment 43 pivotally mounted upon a lateral stub 44 projecting from the web of the end frame casting below the shaft 41. A slotted arm 45 projects from the hub of the gear in a direction diametrically opposite the teeth thereof and a connecting rod 46 is pivotally engaged at one end in the slot in said arm and its opposite end is correspondingly mounted in the slotted lower portion 47 of an oscillating arm 48. This latter arm 48 has its fulcrum or pivot 49 at its upper end which is mounted in a slot 50 formed horizontally in the end frame 2, while intermediate its ends the oscillating arm is provided with a lateral pin 51 that operates in a cam groove 52 in the face of a cam-plate 53 carried upon the adjacent end of the main drive shaft 10, as seen in Figure 2 of the drawings. During the continuous rotation of the main drive shaft 10 the cam groove 52, engaged with the pin 51 on the oscillating arm 48, will cause the latter to move back and forth, which imparts a reciprocatory motion to the segmental gear 43 and consequently an oscillatory movement of the shaft 41, which latter through the pulley 40 and the belt 39, will rotate the spindle 29 first in one direction and then in the other. The rotation of the spindle 29 in the direction indicated by the arrow in Figure 5 will twist the thread which has been looped upon its curved finger, and when the shaft 41 is rotated in a reverse direction the tooth or shoulder 37 of the ratchet element will be brought into engagement with the pawl 38, which will stop the further rotation of the spindle in the reverse direction. Because of the fact that the belt is not too tight upon the pulley 35, the former will slip when the pawl has engaged the ratchet tooth and prevent the rotation of the spindle in the reversed direction. This pawl and ratchet mechanism, and the frictional engagement of the belt with the pulley 35 will thus permit the fringe thread to be twisted the desired number of turns, and when the reverse movement of the shaft 41 takes place the spindle can not be moved in a direction more than a single revolution when it is stopped by the pawl and ratchet device. The tooth or shoulder 37 is so located with respect to the curved finger 30 that when the reverse movement takes place and the reversed movement spindle has been stopped the finger will be properly positioned so as to permit the twisted thread to be thrown off and disengaged therefrom, and it will also be in a position to receive the next loop of the loop of the fringe thread from the looper arm as hereinafter described.

The device that is adapted to throw off the twisted fringe thread consists of an elongated wire finger 54 that moves in an arc or sweep upon a rock shaft 55 and which is secured to the latter by means of a collar or holder 56, as seen in detail in Figure 4 of the drawings. In order to prevent the tassel that is thrown off from mixing with preceding tassels there is provided a wire finger 90 preferably of L-shape that is adjustably secured to the bracket 32 and extends normally above the tassel being twisted as seen in Fig. 3 and it is irregularly curved as in Fig. 4. The rock shaft 55 extends from end to end of the machine and is journaled in the bearings in each of the U-shaped holders 33 heretofore mentioned. A short slotted lever 57 is mounted upon the end of the rock shaft 55 that extends beyond the end frame 2 of the apparatus, which lever is connected by a reciprocating rod 58 to an actuated lever 59 that is adjustably fulcrumed at its lower end in a slot 60 extending horizontally of the end frame 2. A lateral extension 61 projects from the actuating lever 59, and its end is provided with a transverse pin or roller 61ª that operates in a cam groove 62 in a cam plate 63 that is secured to and rotates with the main drive shaft 10.

Mounted upon the angle piece 25 alongside the comb 27 is a guide or eye 64 in the form of a U-shaped wire loop through which the fringe thread 65 passes from a suitable bobbin or other source of supply to the braid or selvedge in front of the comb 27, and as soon as the warp threads 28 have charged their relative positions the comb frame is moved backwardly by means of the connecting rod 20 in the manner heretofore described. As soon as the comb has moved backwardly sufficiently to clear the same the looper arm is swung rapidly across in front of the comb to engage the fringe thread 65 and carry the same across the curved pin 30 of the twister spindle 29 and loop it therein. During this motion of the looper the twister spindle of course is stationary, and just previous thereto the throw-off member 54 has been swung upwardly and disengaged the previously twisted loop from the pin. This looper comprises an arm 66 having its outer end hooked and provided with an enlargement or head 67, the side edge of the latter being grooved as at 68 to engage with the fringe thread 65. At its opposite end the looper arm 66 is also hook shaped and provided with an enlargement 69 that is bored vertically and secured upon the projecting upper portion of a vertically disposed rock-shaft 70 that is journaled in upper and lower alining bearings in the U-shaped holder 33 heretofore mentioned. For this purpose the upper and lower horizontal parallel members 71 and 72 of this U-shaped holder have their outer ends bored in alinement with each other and provide bearings 73 and 74 for the shaft, and the respective bosses are elongated so that they extend towards each other, as shown in Figure 4 of the drawings. Intermediate these bearings 73 and 74 the shaft 70 is provided with a worm 75 that is engaged and actuated by a worm wheel 76 mounted upon a horizontally disposed rock shaft 77. This rock shaft extends from end to end of the apparatus and extends beyond the end frame 1 at the drive end of the machine where it is provided with a lateral arm 78 that is slotted longitudinally. A connecting rod 79 has one end adjustably mounted in the seat of arm 78 and the opposite end of said rod is adjustably mounted in a slot 80 upon the upper end of a vertically disposed oscillating arm 81 that actuates the same. The lower end of the arm 81 is fulcrumed in a slot 82 formed horizontally in the adjacent portion of the end frame 1 of the apparatus, as shown in Figure 1 of the drawings, while intermediate its ends the arm is provided with a lateral member 83, the end of which is provided with a pin, a roller or the like to engage the cam groove 84 in the face of a cam plate 85 mounted upon and rotatable with the main drive shaft 10. Thus, upon each revolution of the drive shaft, the arm 78 is oscillated, which in turn rocks the shaft 77, and through the medium of the worm shaft causes the looper arm 66 to swing across the warp threads, picking up the fringe thread and looping the same upon the curved pin 30 of the twister spindle, and the return movement of the actuating lever 81, through the same instrumentalities, returns the looper-arm 66 to its normal position, as seen in Figure 5 of the drawings, so that the weaving may be resumed and the comb frame moved forwardly again.

The instrumentalities heretofore described are so timed that there is no interference between their operations, the twister spindle being stationary when the throw-off member 54 is raised to disengage the twister fringe thread from the curved pin of the twister spindle and remains stationary while the comb is being drawn backward, after which the looper arm is moved forward to loop another length of the fringe thread upon the curved pin 30. The cams and their connected elements then cause the reverse movement of the spindle, which twists the thread looper upon the curved pin while the comb 27 is in close engagement with the previously woven selvedge. The structure above described in connection with the twister, the throw-off and the looper arm is that of a single unit, and it is understood that there is a plurality of these units positioned at intervals along the bar 34, and by the use of the proper or desired heddles and harness structure a selvedge of different pattern and color, and fringe of different color may be woven upon the several units in the same machine. With the structure herein disclosed, the instrumentalities for twisting may be adjusted and the throw of the looper arm may be so controlled with relation to the selvedge that only desired length of fringe may be fabricated. In order to twist a fringe of, say, five or six inches in length, it would be desirable, of course, to rotate the spindle 29 a greater number of revolutions than would be required for a fringe two or three inches in length. The adjustment necessary, in order to take care of the desired length of fringe, is accomplished by adjusting the end of the connecting rod 46 in the slot in the arm or extension 45 of the segmental gear or by adjusting the opposite end of the connecting rod 46, in the slot 47 of the vertical lever arm 48 that is actuated with the cam. Either or both of these adjustments may be necessary to take care of the particular length of the fringe. It will be understood that the closer the end of the rod 46 is to the pivot 44 of the extension or arm 45 the longer will be the arc of rotation of the segmental gear 43 and consequently the twister spindle will be given a greater number of rotations. In order to take care of an increased length of fringe by the looper arm the comb 27 would be moved closer to the pivot or rock-shaft 70 of the looper so that the selvedge or tape will be positioned a greater distance from the hook or curved pin 30 on the twister spindle.

Suitable mechanism, which forms no portion of my invention, usually is provided for winding the woven fringe upon spools or the like, but, for the purpose of simplicity, the same is not described herein.

It will be understood that instrumentalities other than those specifically disclosed herein may be employed for carrying out the principles of my invention, and it will also be obvious to others skilled in the art that divers modifications and refinements or changes may be made without departing from the principles I have herein disclosed. I desire it to be particularly understood that all such changes are fully contemplated as coming within the scope of the hereto appended claims.

What I claim is:—

1. In a fringe machine a thread twister comprising a spindle provided with means for engaging a looped thread, a pulley fast on said spindle, means for intermittently rotating said pulley in opposite directions whereby to twist and release the looped thread, and a pawl and ratchet mechanism that prevents the rotation of said spindle in one direction more than one revolution at a time.

2. In a fringe machine a thread twister comprising a spindle provided with means for engaging a looped thread, a pulley fast on said spindle, a drive pulley rotatable intermittently in opposite directions, means for actuating said drive pulley, a belt connecting said pulleys, and a pawl and ratchet mechanism whereby the rotation of said spindle in one direction more than one revolution at a time is prevented.

3. In a fringe machine a thread twister comprising a spindle provided with means for engaging a looped thread, a pawl and ratchet operatively connected to said spindle which permits but a single revolution thereof at a time in a given direction, and a belt and pulleys operatively connecting said shaft and spindle whereby the latter is rotated.

4. In a fringe machine a thread twister comprising a rotatable spindle provided with means for engaging a looped thread, a rotatable shaft, a belt and pulleys connecting said shaft and spindle, a rock shaft, means operatively connecting said shafts, and means that permit free rotation of said spindle in one direction and a single rotation in the opposite direction.

5. In a fringe machine a thread twister comprising a rotatable spindle provided with means for engaging a looped thread, a rotatable shaft, a belt and pulleys connecting said shaft and spindle, a rock shaft, means operatively connecting said shafts, and a pawl and ratchet connected to the spindle that permit free rotation of said spindle in one direction and a single rotation in the opposite direction.

6. In a fringe machine a thread twister comprising a spindle provided with means for engaging a looped thread, a rotatable shaft, a belt and pulleys connecting said shaft and spindle, a rock shaft, a segmental gear and pinion operatively connecting said shafts, and a pawl and ratchet connected to said spindle that permit free rotation of said spindle in one direction and a single rotation in the opposite direction.

7. In a fringe machine a thread twister comprising a rotatable spindle provided with means for engaging a looped thread, friction means for actuating said spindle in opposite directions, and devices that cause said means to slip after rotating said spindle a predetermined distance in one direction.

8. In a fringe machine a thread twister comprising a rotatable spindle provided with means for engaging a looped thread, friction means for actuating said spindle in opposite directions, and a pawl and ratchet structure connected to said spindle that causes said means to slip after rotating said spindle a predetermined distance in one direction.

9. In a fringe machine a spindle provided with means for engaging looped threads, a pulley fast on said spindle, means for intermittently rotating said pulley in opposite directions whereby to twist and release the looped thread, a pawl and ratchet mechanism that stops the rotation of said spindle in one direction prior to a complete revolution thereof, a looper arm that engages the fringe thread and carries the same to the looper-receiving means on said spindle, and means for intermittently actuating said looper arm during the stoppage of said spindle.

10. In a fringe machine a spindle provided with means for engaging a looped thread, a pulley fast on said spindle, a drive pulley rotatable intermittently in opposite directions, means for actuating said drive pulley, a belt connecting said pulleys, a pawl and ratchet mechanism that stops the rotation of said spindle at a predetermined point in one direction, a looper arm that engages the fringe thread and carries the same to the loop-receiving means on said spindle, and means for intermittently actuating said looper arm during the stoppage of said spindle.

11. In a fringe machine a spindle provided with means for engaging a looped thread, a pawl and ratchet mechanism operatively connected to said spindle that stops the same prior to a complete revolution thereof in a given direction, a belt and pulleys operatively connecting said shaft and spindle whereby the latter is rotated, a looper arm that engages a flange thread and carries the same to the loop-receiving means on said spindle, and means for intermittently actuating said looper arm during the stoppage of said spindle.

12. In a fringe machine a rotatable spindle provided with means for engaging a looped thread, a rotatable shaft, a belt and pulleys connecting said shaft and spindle, a rock shaft, means operatively connecting said shafts, means that permit free rotation of said spindle in one direction and stop the rotation thereof in the opposite direction at a given point, a looper arm that engages a fringe thread and carries the same to the loop-receiving means on said spindle, and means for intermittently actuating said looper arm during the stoppage of said spindle.

13. In a fringe machine a rotatable spindle provided with means for engaging a looped thread, a rotatable shaft, a belt and pulleys connecting said shaft and spindle, a rock shaft, means operatively connecting said shafts, a pawl and ratchet mechanism connected to said spindle that permits free rotation of said spindle in one direction and stops the rotation thereof in the opposite direction at a given point, a looper arm that engages a fringe thread and carries the same to the loop-receiving means on said spindle, and means for intermittently actuating said looper arm during the stoppage of said spindle.

14. In a fringe machine a rotatable spindle provided with means for engaging a looped thread, a rotatable shaft, a belt and pulleys connecting said shaft and spindle, a rock shaft, a segmental gear and pinion operatively connecting said shafts, a pawl and ratchet mechanism connected to said spindle that permits free rotation of said spindle in one direction and stops the rotation thereof in the opposite direction at a given point, a looper arm that engages a fringe thread and carries the same to the loop-receiving means on said spindle, and means for intermittently actuating said looper arm during the stoppage of said spindle.

15. In a fringe machine a rotatable spindle provided with means for engaging a looped thread, frictional devices for actuating said spindle in opposite directions, means to cause said friction devices to slip after rotating said spindle to a predetermined point in one direction, a looper arm that engages a fringe thread and carries the same to the loop-receiving means on said spindle, and means for intermittently actuating said looper arm during the slippage of said friction device.

16. In a fringe machine a rotatable spindle provided with means for engaging a looped thread, frictional devices for actuating said spindle in opposite directions, a pawl and ratchet mechanism connected to said spindle to cause said friction devices to slip after rotating said spindle to a predetermined point in one direction, a looper arm that engages a fringe thread and carries the same to the loop-receiving means on said spindle, and means for intermittently actuating said looper arm during the slippage of said friction device.

17. In a fringe machine a thread twister comprising a spindle provided with means for engaging a looped thread, a pulley fast on said spindle, means for intermittently rotating said pulley in opposite directions whereby to twist and release the looped thread, devices that prevent the rotation of said spindle in one direction more than one revolution at a time, and means for predetermining the number of twisting revolutions imparted to said spindle.

18. In a fringe machine a thread twister comprising a rotatable spindle provided with means for engaging a looped thread, friction means for actuating said pulley in opposite directions, devices that cause said means to slip after rotating said spindle a predetermined distance in one direction, and means for predetermining the number of twisting rotations imparted to said spindle.

19. In a fringe machine a thread twister comprising a rotatable spindle provided with means for engaging a looped thread, a rotary reciprocable shaft, means operatively connecting said spindle and shaft, a pinion on said shaft, a segmental gear in mesh with said pinion, an oscillating lever, and a connecting rod pivotally connected at one end to said lever and having a pin and slot connection with said segmental gear at its opposite end.

20. In a fringe machine a thread twister comprising a rotatable spindle provided with means for engaging a looped thread, a rotary reciprocable shaft, means operatively connecting said spindle and shaft, a pinion on said shaft, a segmental gear in mesh with said pinion, an oscillating lever, and a connecting rod pivotally connected at one end to said segmental gear and having a pin and slot connection with said lever at its opposite end.

Signed at Chicago, county of Cook and State of Illinois, this 21st day of April, 1924.

CHRISTIAN B. NELSON.